United States Patent [19]

Brown et al.

[11] Patent Number: 5,070,989
[45] Date of Patent: Dec. 10, 1991

[54] LOG SWEEP POSITIONER

[75] Inventors: Ernest W. Brown, Texarkana, Ark.; Herschel A. Farmer, Springhill, La.

[73] Assignee: International Paper Company, Tuxedo Park, N.Y.

[21] Appl. No.: 293,853

[22] Filed: Jan. 5, 1989

[51] Int. Cl.⁵ .............................. B65G 47/24
[52] U.S. Cl. ................... 198/394; 83/708; 144/376; 144/378; 144/245 A; 144/246 F; 144/242 H; 414/757
[58] Field of Search ............... 198/394; 83/708, 436; 144/376, 378, 245 A, 246 F, 246 D, 242 C, 242 D, 242 H; 414/431, 433, 757

[56] References Cited

U.S. PATENT DOCUMENTS

| 7,158 | 10/1850 | Tenow et al. | 83/436 X |
| 489,178 | 1/1893 | Bloss | 414/433 X |
| 553,351 | 1/1896 | Matthews | 83/708 |
| 892,176 | 6/1908 | Moravec | 414/433 X |
| 2,401,500 | 6/1946 | Ockfen | 83/436 X |
| 2,575,302 | 11/1951 | Shaw | 414/433 X |
| 3,480,158 | 11/1969 | Pardjiris et al. | 414/757 |
| 4,029,196 | 6/1977 | Ekholm | 83/708 X |
| 4,176,998 | 12/1979 | Wittenrich | 414/433 |
| 4,177,682 | 12/1979 | Blackman | 414/433 X |
| 4,294,149 | 10/1981 | Olsson | 83/435.1 |
| 4,365,704 | 12/1982 | Stenvall | 198/395 |
| 4,458,567 | 7/1984 | Tuomaala | 83/708 X |
| 4,489,635 | 12/1984 | Cooper | 83/708 |
| 4,532,842 | 8/1985 | McFarlane | 83/404.1 |
| 4,554,958 | 11/1985 | Schmidt | 144/242 C X |
| 4,570,687 | 2/1986 | Dietz | 83/708 X |
| 4,628,781 | 12/1986 | Rowley | 198/468.2 X |

Primary Examiner—Robert P. Olszewski
Assistant Examiner—Cheryl L. Gastineau
Attorney, Agent, or Firm—Walt Thomas Zielinski; Stewart L. Gitler

[57] ABSTRACT

A curved log to be sawn lengthwise by a vertical saw blade is supported for a time, near its center of gravity, by a device which permits the log to rotate about its axis, and thus find an orientation at which the plane of the curve of the log axis is vertical, so as to maximize yield from the log. The device also includes drive sprockets which operate, at certain angular positions of the device, to move the log lengthwise.

12 Claims, 3 Drawing Sheets

LOG SWEEP POSITIONER

BACKGROUND OF THE INVENTION

This invention related to the field of sawing, and more particularly to a device for orienting logs so as to maximize useful yield when the logs are sawn.

In a sawmill, as logs are moved longitudinally relative to a saw blade, either by moving the logs or by moving the saw, a cut substantially parallel to the log axis results. In order to maximize yield, the angularity of the log axis with respect to the direction of log movement may be controlled; the orientation of the log about its axis, with respect to the plane of the saw blade may also be controlled. These orientations become more important the more a particular log deviates from an ideal cylindrical shape.

A common variation from cylindrical shape in logs is "sweep", which term describes a log whose axis is curved, rather than being a straight line. Feeding mechanisms normally are not adapted to follow the sweep of the log, so straight-line sawing must be done in a way that maximizes yield from such a log. Although it is possible for a log axis to follow a corkscrew path, or other compound curve, it is more common for a log axis to follow a simple curve lying substantially in a single plane. For such a log, it can be shown that yields are maximized by cutting the log in planes parallel to the plane containing the log axis. Thus, where a saw blade lies in a vertical plane, the plane in which the log axis lies should also be vertical.

Prior devices have been proposed for controlling the orientation of logs as they are fed to a saw. U.S. Pat. Nos. 4,294,149, 4,365,704, 4,570,687 and 4,458,567 are representative. Optical scanners and the like may be used in association with log turners to properly orient logs for sawing, as in U.S. Pat. No. 4,294,149, above. Otherwise, the logs may be rotated manually, or by manually controlled machines, with the exercise of human judgment.

SUMMARY OF THE INVENTION

The present invention has an object of automatically orienting curved logs about their axis as they are fed to a saw in such a way as to maximize yield. It is desired to do so without employing log turners, and without the need for automatic sensors and the like, and yet to avoid the errors inevitably resulting from the use of judgment.

Accordingly, the invention is summarized as a method of orienting curved logs for sawing by a vertical sawblade, comprising a step of supporting the log near its center of gravity for a period of time, while permitting the log to rotate freely about its axis under the influence of gravity. By this simple method, the logs automatically orient themselves properly—with the curve of the axis in a vertical plane—in a minimum amount of time, without the need for human supervision or artificial intelligence.

The method is carried out by an apparatus comprising a device for supporting a log near its center of gravity, the supporting means including means for permitting the log to rotate freely about its axis.

BRIEF DESCRIPTION OF THE DRAWINGS

In the accompanying drawings,

FIG. 1 shows a curved log L supported by a roller conveyor 10 so that the axis of the log extends generally horizontally. The curve is exaggerated, so as to show clearly that the plane P containing the simply curved axis A is substantially horizontal; thus, the log is not oriented optimally for sawing by a vertical blade. In FIG. 2, the log, supported at its midpoint by a turning device 12, has been permitted to rotate by gravitational force so that the plane P is substantially vertical. The turning device and method are described in detail below.

DESCRIPTION OF THE PREFERRED EMBODIMENT

The invention is embodied in a log turning device 12, associated with the conveyor 10 described above.

Figure 3:
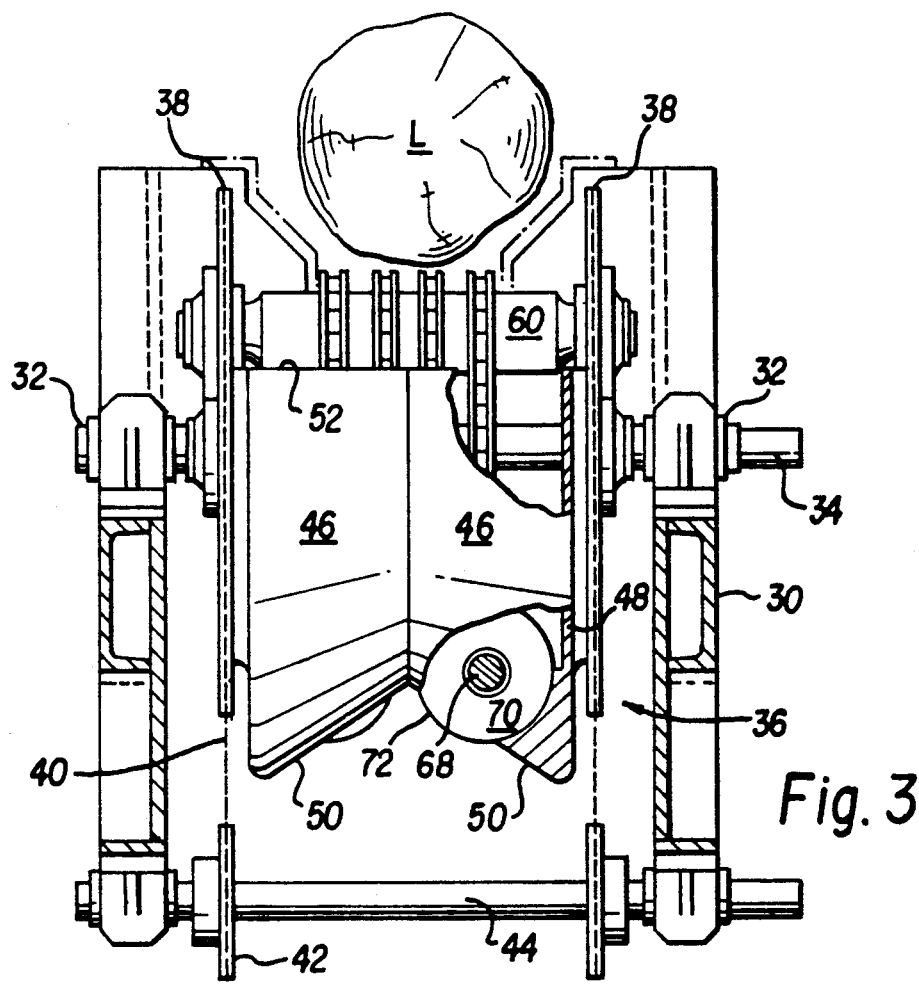
FIG. 3 is an end view in partial section, showing the method of the invention being implemented by a apparatus supporting the log.
Figure 5:
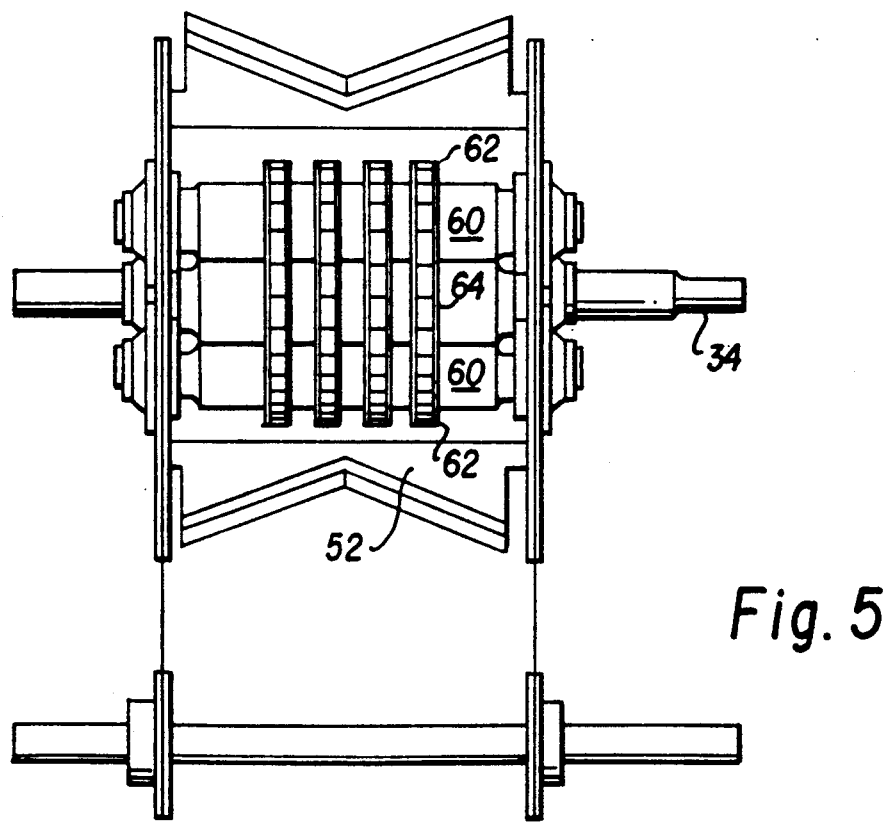
FIG. 5 is a top plan view showing details of the apparatus.
Figure 4:
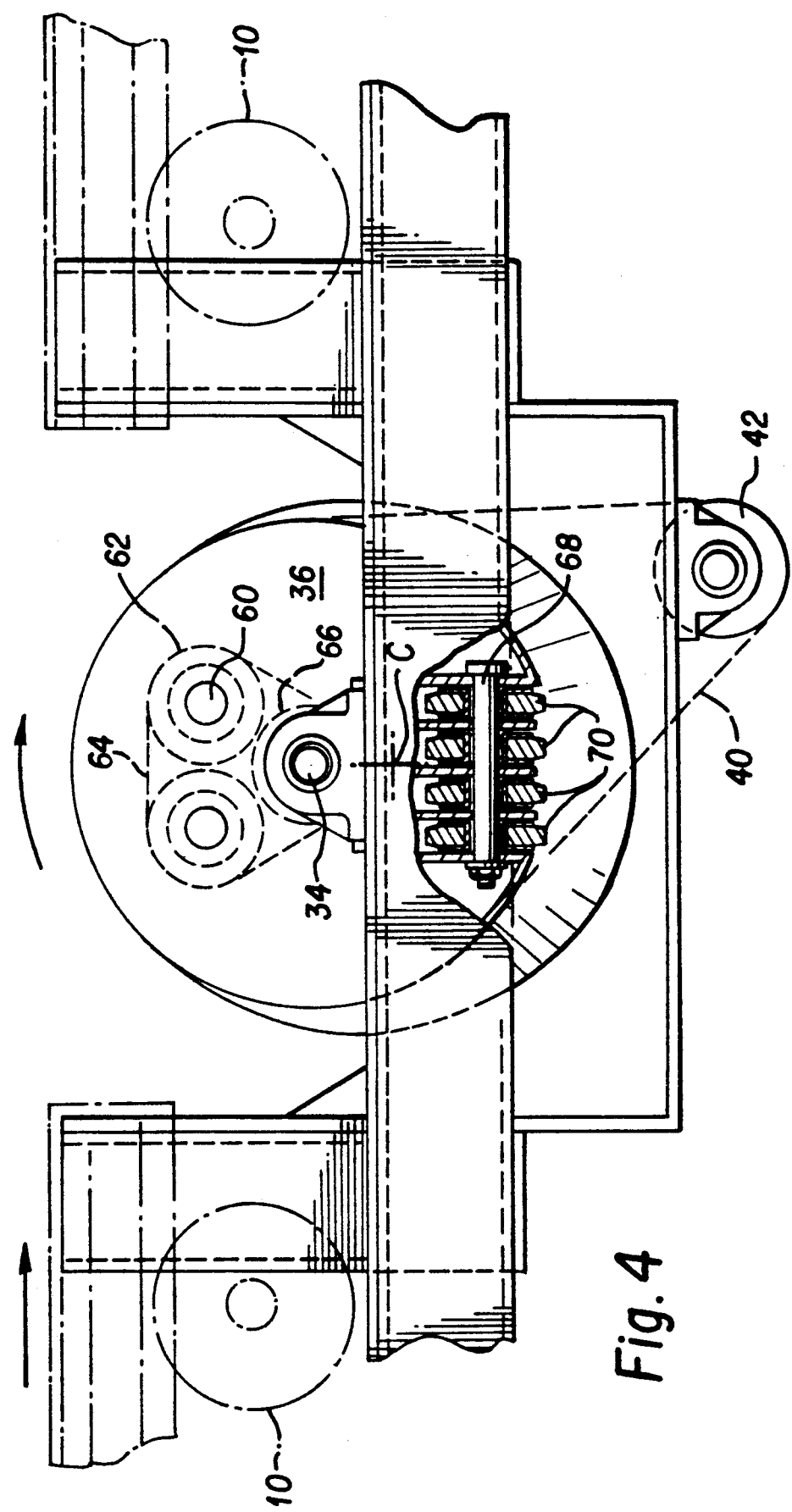
FIG. 4 is a side elevation of the apparatus illustrated in FIG. 3, with portions partially broken away to show underlying structure.

As shown in FIGS. 3-5, the device comprises a frame 30 attached to the frame of the conveyor 10 and extending upwardly therefrom. A pair of antifriction bearings 32 connected to the frame support a horizontal shaft 34 upon which a cage 36 is mounted in such a way that the cage may rotate with respect to the shaft. Sprockets 38 on either side of the cage are connected by drive chains 40 to respective sprockets 42 on a driveshaft 44, so that the driveshaft turns the cage.

The cage 36 supports a pair of hollow cams 46, each of which has the shape of the frustum of a cone, each tapering toward the other so that an annular groove or valley is formed between the cams, as seen in FIG. 3. The cams have a common cone axis C, which is parallel to but radially offset from the axis of the cage; thus the cams are eccentrically mounted with respect to the cage, for reasons that will become apparent. Each cam has a base 48 connected to the cage, as by welding, and a peripheral surface 50 which engages logs as described hereafter. The peripheral surfaces may be provided with studs or spikes if desired, to prevent logs from rotating while supported by these surfaces. A segment of each cam is cut out of each cam, defining edge 52.

As shown in FIG. 5, a pair of log drive rolls 60 are supported by the cage, each roll being rotatable about an axis parallel to that of the shaft 34. Four sprockets 62 are mounted on each of the rolls, the sprockets being spaced along the length of each roll. The sprockets are connected by respective chains 64 to correspondingly spaced sprockets 66 mounted on and affixed to the shaft 34. Thus, the rolls 60 rotate in the same direction as the shaft 34.

On the opposite side of the cage, two parallel rods 68, FIG. 4, whose axes lie in planes perpendicular to the axis of shaft 34, are supported by webs welded within the cage. Each of these rods supports four wheels 70 having bearings or bushings that render the wheels freely rotatable at all times. The periphery 72 of each wheel 70 protrudes through an opening in the cam with which it is associated, slightly above the peripheral surface thereof, so that it can engage logs passing over the device, in certain angular positions of the cage.

The cage may be turned, by means of the driveshaft, between a log driving position in which the sprockets 62 are uppermost, and a log turning position in which the wheels 70 are uppermost. In the driving position, a log passing over the device is engaged from below solely by the sprockets 62 and chains 64. In the turning position, the log is supported solely by the wheels 70, and in intermediate positions, the log is supported by the peripheral surfaces of the cams.

In operation, a series of logs are passed down the conveyor 10 to the device 12. The cage is normally maintained stationary in the log driving position ("first position", in the following claims), so that the sprockets 62 contact the log. During the feeding phase, the shaft 34 is rotated by drive means (not shown), so the sprockets rotate as well, and propel the log forward. As the log progresses across the device 12, with drive shaft 34 rotating, a point is reached at which the midpoint of the log is upstream of the device by a distance equal to one-half the circumference of the cage assembly. This point may be determined by an operator or by various devices, such as optical sensors, particularly where the logs are of known length. The operator or the sensor then activates the drive shaft 44 to rotate the cage 36, whose cam surfaces serve as means for elevating the log while continuing to carry it forward so that the wheels 70 contact the log at approximately its midpoint. After about 160° of rotation from the drive position, the log becomes supported solely by the wheels 70, and is then free to rotate about its axis.

Figure 1:
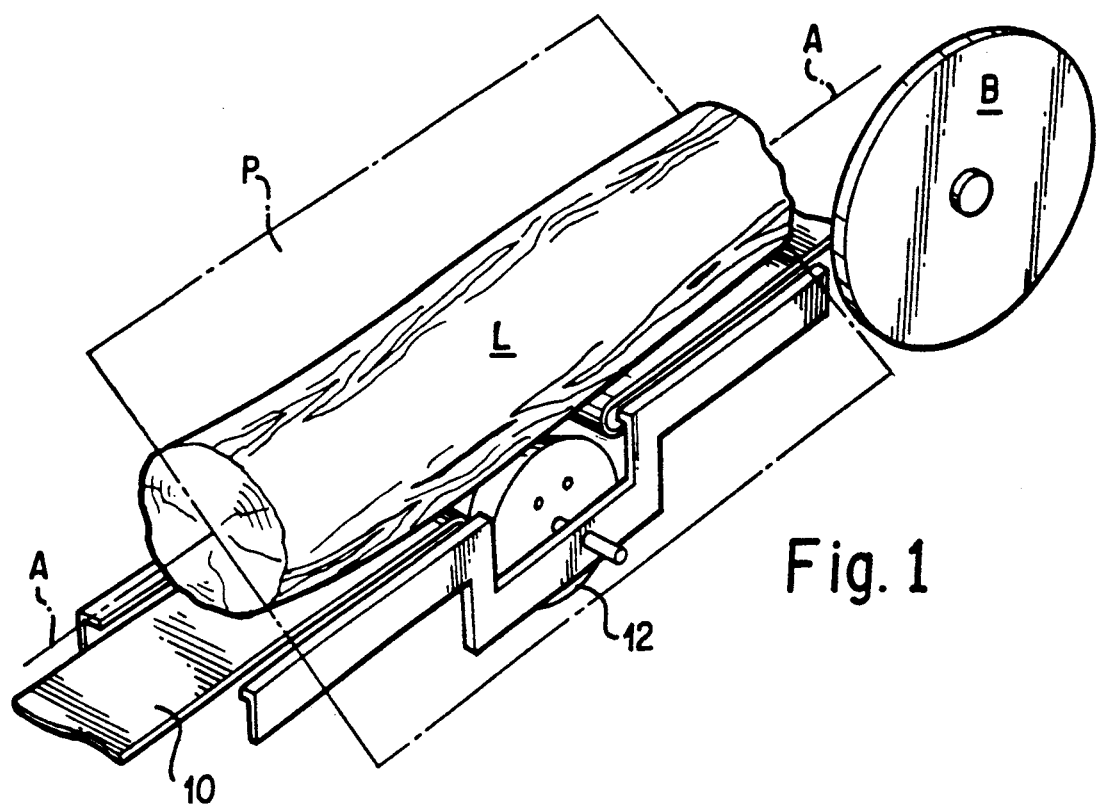
FIG. 1 is an isometric view showing a typical log having sweep, supported horizontally by a conveyor.
Figure 2:
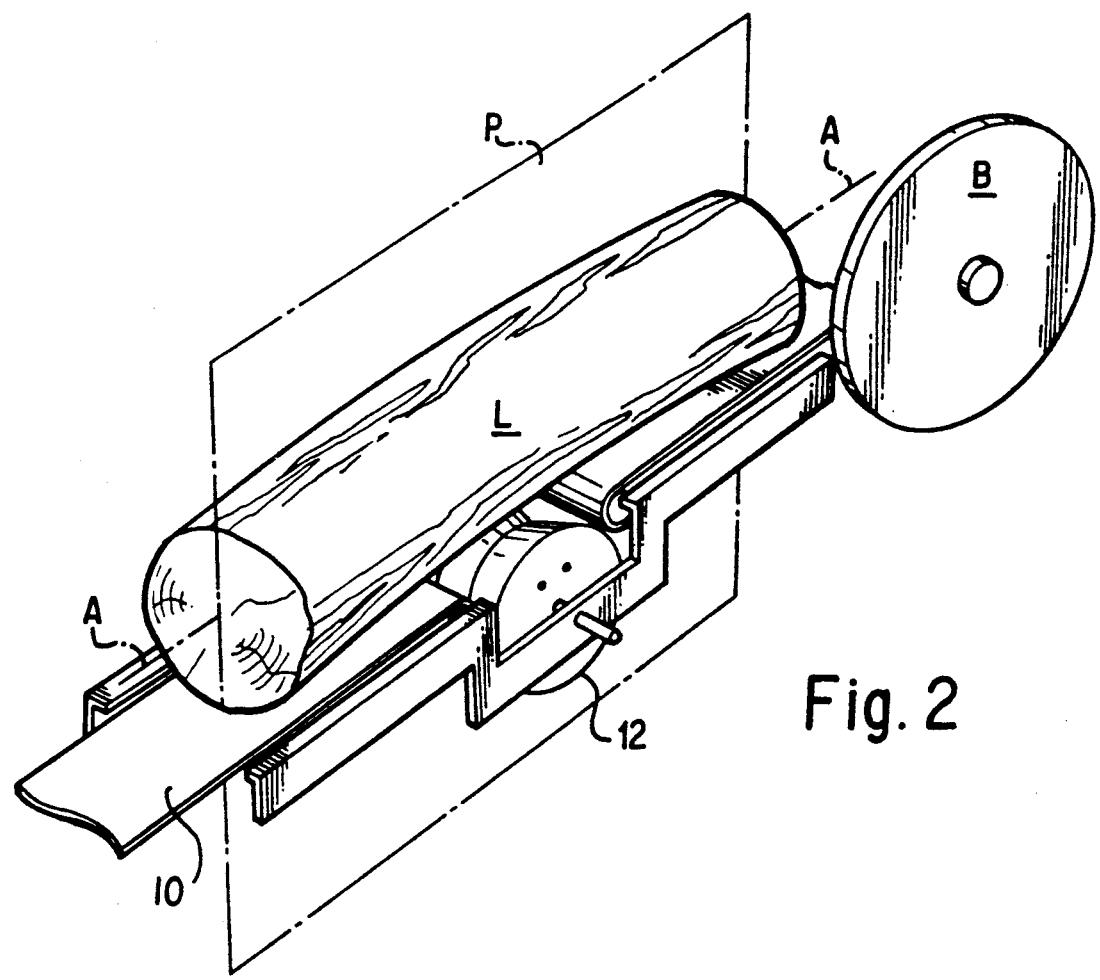
FIG. 2 shows in isometric the same log, properly oriented for sawing by a vertical blade.

At the 180° point ("second position", in the following claims), because the wheels define a flat, and now horizontal supporting surface, the log drops slightly; the jarring action helps initiate any necessary turning. Since the log is centered lengthwise on the device, the great majority of its weight is supported by the wheels, with only incidental contact, perhaps, occurring between one end of the log and the conveyor 10. Regardless, the log is substantially free now to rotate around its own axis, and does so under the influence of gravity, until the center of gravity of the log is at a minimum height. For a simply curved log, at this point, the "horns" at the ends of the curve are downward, and the curve is in a substantially vertical plane, properly oriented for sawing by a vertical blade, designated B in FIGS. 1 and 2.

Upon continued rotation of the device, the cage lowers the log back onto the conveyor, whereafter convention devices may be employed to maintain the log in its proper angular orientation on the conveyor. Once the chains 64 come back into contact with the logs, they propel it down the conveyor, and the positioning device is ready for another log.

The foregoing description, and the accompanying drawings, describe only one embodiment of the invention, which is subject to many variations and changes in detail. For example, the number of sprockets and wheels can be changed and still produce the desired effect, and equivalent components can be substituted for those mentioned. Therefore, the invention should be measured by the claims that follow.

What is claimed is:

1. A method of orienting a curved log for sawing by a vertical saw blade, comprising steps of
supporting the log only near its center of gravity for a period of time, while permitting the log to rotate freely about its axis under the influence of gravity.

2. An apparatus for orienting curved logs for sawing by a vertical saw blade, comprising
at least two horizontal freely rotatable rollers for supporting the log, and means for bringing said rollers into contact with said log so as to support the same only in a central area defined beneath its center of gravity, said apparatus being free of any restraint against rotation of the log about its axis while said rollers thus support the log, whereby the log may rotate to a position at which its center of gravity is at a minimum height and its curvature lies in a substantially vertical plane.

3. An apparatus for orienting curved logs for sawing by a vertical saw blade, comprising
a device for mounting at a gap in a log conveyor, the device comprising
a cage mounted for rotation about a substantially horizontal axis,
means for rotating said cage about said axis,
means, mounted on said cage, for propelling a log longitudinally, said propelling means being uppermost in one position of said cage so as to contact the log, and
means, mounted on said cage, for supporting the log and permitting it to rotate freely about its axis under the influence of gravity, said supporting means being uppermost in a second position of said cage so as to come into contact with the log.

4. The invention of claim 3, wherein said cage rotating means comprises at least one sprocket attached to said cage and chain drive means for rotating said sprocket.

5. The invention of claim 3, wherein the means for supporting the log and permitting rotation thereof comprise a plurality of wheels mounted for free rotation on axes lying in respective planes perpendicular to the rotational axis of said cage.

6. The invention of claim 5, wherein said wheel axes are defined by a pair of parallel rods affixed to said cage, a plurality of wheels being mounted on each of said rods.

7. The invention of claim 3, wherein said propelling means comprise a plurality of chains running on respective sets of sprockets disposed in vertical planes parallel to the axis of the log.

8. The invention of claim 7, further comprising a shaft extending horizontally transverse to the axis of the log and coincident With the axis of rotation of said cage, said cage being mounted upon said shaft for rotation with respect thereto.

9. The invention of claim 8, wherein one of the sprockets upon which each of said chains run is affixed upon said shaft.

10. The invention of claim 3, wherein said supporting means lie at a greater radial distance from the rotational axis of the cage than do said propelling means, and further comprising means for lifting the log from a first elevation at which the log is in contact with the propelling means, to a second elevation at which the log rests upon said supporting means, as said cage rotates from said first cage position to said second cage position.

11. The invention of claim 10, wherein said lifting means comprises a pair of cams having frustoconical surfaces forming an annular groove therebetween, said cams being mounted eccentrically upon the cage so that the log is engaged and lifted by the cams as the cage rotates between its first and second positions.

12. The invention of claim 10, further comprising a log conveyor extending horizontally on opposite sides of said device, said conveyor having a supporting surface Whose elevation is less than that of said propelling means in said first cage position.

* * * * *

UNITED STATES PATENT AND TRADEMARK OFFICE
CERTIFICATE OF CORRECTION

PATENT NO. : 5,070,989

DATED : December 10, 1991

INVENTOR(S) : Ernest W. Brown et al

It is certified that error appears in the above-identified patent and that said Letters Patent is hereby corrected as shown below:

On title page, item [56],

The first U.S. Patent should be:

1,007,158  10/1911  Tenow et al............... 83/436 X

Signed and Sealed this

Ninth Day of March, 1993

Attest:

STEPHEN G. KUNIN

Attesting Officer

Acting Commissioner of Patents and Trademarks